(12) United States Patent
Stanek

(10) Patent No.: US 6,803,997 B2
(45) Date of Patent: Oct. 12, 2004

(54) GRIDLOCKING AND CORRELATION METHODS AND ARRANGEMENTS

(75) Inventor: Clay J. Stanek, Poway, CA (US)

(73) Assignee: Anzus, Inc., San Diego, CA (US)

( * ) Notice: Subject to any disclaimer, the term of this patent is extended or adjusted under 35 U.S.C. 154(b) by 393 days.

(21) Appl. No.: 10/093,535

(22) Filed: Mar. 8, 2002

(65) Prior Publication Data

US 2003/0169413 A1 Sep. 11, 2003

(51) Int. Cl.$^7$ .......................... G01C 11/12; G06K 9/64
(52) U.S. Cl. .......................................... 356/2; 382/278
(58) Field of Search ............................ 356/2; 382/278, 382/293, 294, 296

(56) References Cited

U.S. PATENT DOCUMENTS

| | | | |
|---|---|---|---|
| 4,832,447 A | 5/1989 | Javidi | |
| 5,111,515 A | 5/1992 | Javidi | |
| 5,119,443 A | 6/1992 | Javidi et al. | |
| 5,367,579 A | 11/1994 | Javidi et al. | |
| 5,485,312 A | 1/1996 | Horner et al. | |
| 5,600,373 A | 2/1997 | Chui et al. | |
| 5,699,449 A | 12/1997 | Javidi | |
| 5,794,173 A | 8/1998 | Schutte | |
| 5,841,907 A | 11/1998 | Javidi et al. | |
| 5,903,648 A | 5/1999 | Javidi | |
| 6,002,773 A | 12/1999 | Javidi | |
| 6,021,378 A | 2/2000 | Reiter et al. | |
| 6,104,336 A | 8/2000 | Curran et al. | |
| 6,104,345 A | 8/2000 | Tweg et al. | |
| 6,202,033 B1 | 3/2001 | Lange | |
| 6,225,942 B1 | 5/2001 | Alon | |
| 6,233,357 B1 | 5/2001 | Li et al. | |
| 6,282,496 B1 | 8/2001 | Chowdhary | |
| 6,289,132 B1 | 9/2001 | Goertzen | |
| 6,317,688 B1 | 11/2001 | Bruckner et al. | |
| 6,332,030 B1 | 12/2001 | Manjunath et al. | |
| 6,343,155 B1 | 1/2002 | Chui et al. | |

OTHER PUBLICATIONS

Tien–Hsin Chao & Hua–Kuang Liu, Real–time Optical Holographic Tracking of Multiple Objects, Applied Optics, vol. 28, No. 2, Jan. 15, 1989, pp. 226–231.

Eugene Hecht, Adelphi University, Optics, Third Edition, pp. 437–438, 442, 532, 456, 457, 602–604, Addison–Wesley.

Kenneth H. Fielding, Joseph L. Horner, Charles K. Makekau, Optical Fingerprint Identification by Binary Joint Transformation, Optical Engineering, vol. 30, No. 12, Dec. 1991, pp. 1958–1961.

(List continued on next page.)

Primary Examiner—Frank G. Font
Assistant Examiner—Michael A. Lyons
(74) Attorney, Agent, or Firm—Blakely Sokoloff Taylor & Zafman, LLP

(57) ABSTRACT

The present invention is in the area of tracking objects with systems such as correlation, gridlocking, optical correlation, and combinations thereof. Embodiments encompass systems of process and/or equipment to correlate objects and gridlock sensors with images based upon track data from sensors. In many of the embodiments the sensors may comprise radars, global positioning systems, laser target designators, seismic sensors or systems of seismic sensors comprising hydrophones and geophones, and other similar systems. While embodiments may comprise an optical correlator, many embodiments perform one or more analyzes statistically. Embodiments may refine coordinate transformations for the sensors and may account for errors by comparing a full or partial history of the track data associated with the same object from the same sensor. Further, many embodiments comprise software that can execute on a laptop, desktop, or similar computer.

34 Claims, 6 Drawing Sheets

OTHER PUBLICATIONS

Subhasis Saha, Image Compression—from DCT to Wavelets: A Review, ACM Crossroads Student Magazine, http://www.acm.org/crossroads/xrds6–3/sahaimgcoding.html., pp. 1–14.

H. John Caulfield, Templates for Invention in the Mathematical and Physical Sciences with Applications to Optics, Proceedings of SPIE vol. 4392, 2001, pp. 104–117, SPIE.

Eddy C. Tam, Francis T. S. Yu, Don A. Gregory, Richard D. Juday, Autonomous Real–Time Object Tracking with an Adaptive Joint Transform Correlator, Optical Engineering, vol. 29, No. 4, Apr. 1990, pp. 314–320.

Yu Hen Hu, University of Wisconsin, Madison, Visual Artifact Reduction By Post–Processing, Presented at Carnegie Mellon University, Dept, ECE, Nov. 1, 2001, pp. –69.

Shahriar Mirabbasi, On the Design of Multirate Filter Banks by H ~ Optimization, Master of Applied Science, 1997, Dept. of Electrical & Computer Engineering, University of Toronto, pp. –37.

C. S. Weaver & J. W. Goodman, A Technique for Optically Convolving Two Functions, Applied Optics, vol. 5, No. 7, Jul. 1966, pp. 1248, 1249.

Ali M. Reza, Wavelet Characteristics, Spire Lab, UWM, Oct. 19, 1999 White Paper, pp. 1–9.

http://www.diffuse.org/compress.html, Diffuse Guide to Image Compression, pp. 1–8.

Edward H. Adelson, Subband Coring for Image Noise Reduction, Internal Report, RCA David Sarnoff Research Center, Nov. 26, 1986, pp.–14.

Julien Reichel, Gloria Menegaz, Marcus J. Nadenau & Murat Kunt, Integer Wavelet Transform for Embedded Lossy to Lossiess Image Compression, Signal Processing Laboratory, Swiss Federal Institute of Tecnology, Lausanne, Switzerland, pp. 1–9.

Shuo–Yen Choo & Gregory Chew, EE362—JPEG 2000 and Wavelet Compression, http://www–ise.stanford.edu/class/psych221/00shuoyen, pp. 1–23.

Cardinal Warde & Arthur D. Fisher, Spatial Light Modulators: Applications and Functional Capabilities, Optical Signal Processing, Copyright 1987 by Academic Press, Inc., pp. 477–523.

Martin Vetterli & Jelena Kovacevic, "Wavelets and Subband Coding," Wavelets, Filter Banks and Multiresolution Signal Processing, 1995, pp. 1–13, Prentice Hall.

Bahram Javidi & Chung–Jung Kuo, Joint Transform Image Correlation Using a Binary Spatial Light Mosulator at the Fourier Plane, Applied Optics, vol. 27, No. 4, Feb. 15, 1988, pp. 663–665.

Henri Rajbenbach, Dynamic Holography in Optical Pattern Recognition, SPIE vol. 2237, Optical Pattern Recognition V (1994), pp. 329–346, SPIE.

Bahram Javifi, Processing for Encryption and Security Systems, Optics & Photonics News, Mar. 1997, pp. 29–33.

Bahram Javidi & Joseph L. Horner, Single Spatial Light Modulator Joint Transform Correlator, Applied Optics, vol. 28, No. 5, Mar. 1, 1989, pp. 1027–1032.

Bahram, Javidi, Nonlinear Joint Power Spectrum Based Optical Correlation, Applied Optics, vol. 28, No. 12, Jun. 15, 1989, pp. 2358–2367.

Bahram Javidi, Jun Wang & Qing Tang, Nonlinear Joint Transfrom Correlations, Pattern Recognition, vol. 27, No. 4, Copyright 1994 pattern Recognition Society, Printed in Great Britian, pp. 523–542.

GRIDLOCKING AND CORRELATION METHODS AND ARRANGEMENTS

FIELD OF INVENTION

The present invention is in the field of tracking objects. More particularly, the present invention provides a method, apparatus, system, and machine-readable medium to correlate objects and gridlock sensors with images based upon track data from sensors such as radars, global positioning systems, laser target designators, seismic sensors, and the like.

BACKGROUND

Correlating objects and gridlocking radars can potentially provide a more accurate depiction of a theater, or model of an area of interest, because the theater is based on tracks from multiple radars rather than one radar. Tracks include data sensed about an object or target by a sensor such as radars, global positioning systems, laser target designators, seismic sensors, and the like, and the data can include the positions and velocities of planes, ships, troops, or other targets. Correlating objects, or correlation, is a process of comparing tracks from different radars to determine which tracks are duplicate tracks. The goal of correlation is to reduce the number of redundant or duplicate tracks so that a theater accurately depicts the objects present within the area of interest, providing a Single Integrated Picture (SIP). Correlation requires substantial statistical analysis in many applications since each radar tracks the position of the object with respect to location and orientation known with uncertainty, especially in applications wherein one or more radars may change positions over a period of time. A global positioning system and compass system at each radar estimates the location and orientation within a margin of error; however, it can be a relatively crude estimate, especially when the platform is in motion. As a result, correlating objects is typically accomplished on a powerful computer by statistical, associative methods. There have been many such approaches over the years for correlation including simple nearest neighbor algorithms, probabilistic data association filtering, multiple hypothesis testing, and others. The nearest neighbor association compares each track of a sensor with each track of another sensor individually to determine the cost of matching a pair of tracks, or cost of determining that the tracks correspond to the same object. The assignment or the Munkres assignment algorithm, for example, assigns the tracks to pairs based upon the example, assigns the tracks to pairs based upon the least overall costs for the matched pairs and satisfies the sequentially most probable hypothesis approach.

Gridlocking, or sensor registration, is a process of combining unique objects from more than one radar by determining the difference in position and orientation of the radars based upon the matched pairs. The goal of gridlocking is to reduce navigation errors and sensor misalignment errors so that one sensor's track data is accurately transformed into another sensor's coordinate system, e.g. radar-aligned. Gridlocking is necessary in many applications for the same reasons that correlation needs significant statistical analysis, the unknown and misaligned radars. The misalignment of tracks from the radars will cause errors when combining objects from different radars to generate the theater. Gridlocking is a data processing algorithm with a predictor-corrector type architecture, typically accomplished on a powerful computer that compares differences in position and orientation of matched pairs with techniques such as Kalman filtering or a similar weighted least-squares approach to find a bias error vector. This bias error vector is used to compute positional adjustments (PADS) to the tracks reported from a given radar. The coordinate transformation adjusts the tracks of the sensors to match the coordinate system chosen for the theater, one track of each matched pair of tracks is discarded (or are possibly combined), and the remainder of the tracks, including the tracks unique to each of the multiple radars, generate or update the theater. However, a problem involved with gridlocking is that gridlocking one radar with another radar based upon pairs of tracks for the same objects is difficult when a pair of tracks determined to describe the same object is inaccurate. For instance, rough correlations of the tracks include mismatches and each individual track pair within an overlap of the two radars, including mismatched pairs, is statistically compared based upon distances and velocities of the tracks to minimize distance and orientation differences. In addition, some systems attenuate the errors by effectively averaging the statistical distance and orientation differences at the expense of additional computing power and time when multiple, candidate track pairs are provided. Further, individual treatment of tracks pairs or tracks for gridlocking, as well as correlation, gives rise to an increase in computational demand with each additional track, or increase in data, effectively precluding the recalculation of coordinate transformations and matched pairs with prior or historical track data.

The computer balances the desire for improved depictions of the theater and the computation demands. An increase in the data that is collected and processed about objects at a given moment in time can potentially increase the accuracy of the theater. For example, a radar drops targets or objects on occasion so that radar will not transmit a track for the object, however, the object will probably be tracked by at least one radar when the object is within the range of two or more radars. The Cray, or similar, computer performs the loops and nested loops of computation for statistical analyses with low latencies to allow more data to be processed. However, the Cray computer gives rise to a problem of portability and latencies inherent to transmitting data to the computer and from the computer back to the theater rather than moving the computer near the sources of data.

BRIEF FIGURE DESCRIPTIONS

In the accompanying drawings, like references may indicate similar elements:

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

The present invention is in the area of tracking objects with systems such as correlation, gridlocking, optical correlation, and combinations thereof. Embodiments encompass systems of process and/or equipment to correlate objects and gridlock sensors with images based upon track data from sensors such as radars, global positioning systems, laser target designators, seismic sensors, seismic sensors or systems of seismic sensors comprising hydrophones and geophones, and/or other similar systems. Low latencies involved with correlating and gridlocking data, in many embodiments, may facilitate the use of this wider variety of sensors. While embodiments may comprise an optical correlator, many embodiments perform some analyses statistically. A statistical technique may comprise Kalman filtering, probabilistic data association filtering, Neyman-Pearson hypothesis testing, and a Munkres assignment, or the like. Optical techniques may comprise frequency plane correlation, electrically addressed spatial light modulation and optically addressed spatial light modulation, joint transform correlation, or a hybrid correlation.

Embodiments may take into account determinations or calculations to refine coordinate transformations for the sensors and may take into account errors in those determinations by comparing a full or partial history of the data from tracks associated with the same object from the same sensor. Other embodiments may take into account determinations or calculations regarding tracks describing the same object by different sensors and may take into account errors in those determinations by comparing pairs of tracks associated with more than one object at the same or substantially the same time. Further, many embodiments comprise software that can execute on a laptop, desktop, or similar computer.

Figure 1:
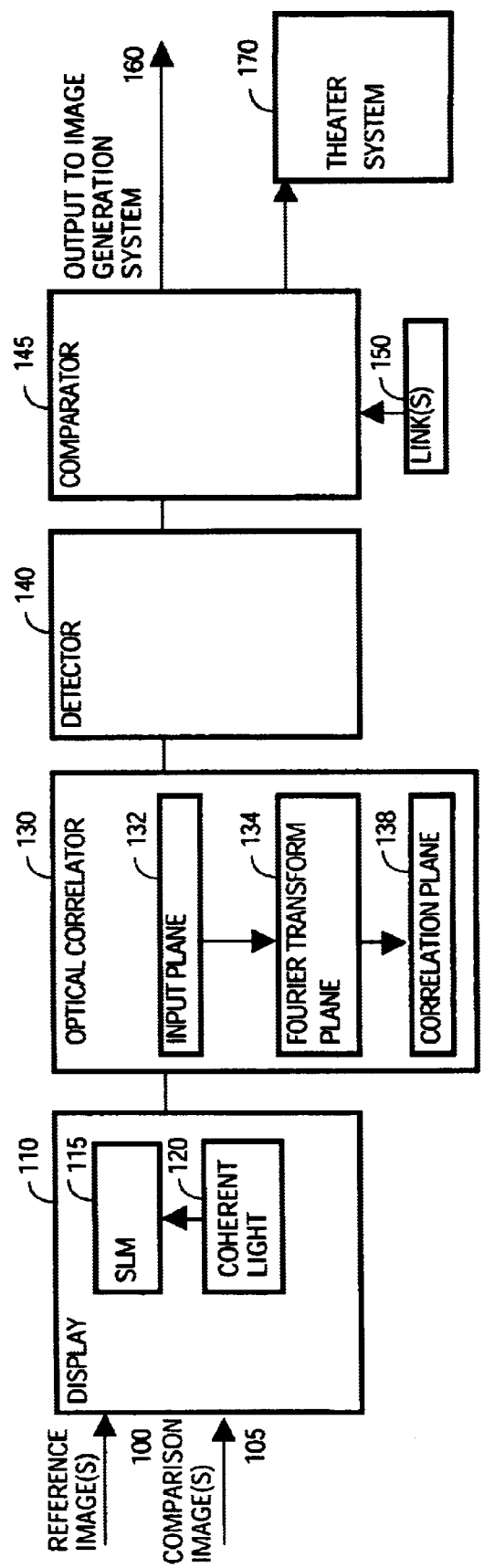
FIG. 1 depicts an embodiment of a system to correlate objects and gridlock sensors with images based upon track data from sensors.

Referring now to FIG. 1, there is shown an embodiment of a system to correlate objects and gridlock sensors with images based upon track data from sensors. The embodiment may comprise a display 110, an optical correlator 130, a detector 140, a comparator 145, and a theater system 170. Display 110 may comprise inputs to receive reference image(s) 100 and comparison image(s) 105 to display as coherent images at input plane 132 of optical correlator 130. Reference image(s) 100 may comprise images based upon a first track about a first object and comparison image(s) 105 may comprise images based upon a second track about a second object sensed substantially simultaneously with the first track. Reference image(s) 100 and comparison image(s) 105 may facilitate a correlation of objects from sensors or may facilitate gridlocking of sensors. For example, when gridlocking sensors, reference image(s) 100 and comparison image(s) 105 may be designed to compare the locations of several objects with respect to each sensor or a transformation of each sensor. Reference image(s) 100 may comprise an image with a pattern based upon several tracks within a sensor overlap of two or more sensors. The first sensor may sense the first object as well as other objects within the sensor overlap. Comparison image(s) 105 may comprise one or more images with patterns based upon the same objects, plus or minus some objects. The one or more comparison images may include rotations of an image generated with track data from one sensor and/or may include images from more than one sensor that comprise the same sensor overlap. The rotations of a comparison image may facilitate a determination of the orientation of the reference sensor with respect to the orientation of the comparison sensor, wherein the reference sensor is a source of track data for a reference image and a comparison sensor is a source of track data for a comparison image. One such technique, incorporated herein by the following reference, is described in a co-pending patent application entitled "Methods and Arrangements to Enhance Gridlocking", Ser. No. 10/094,037, filed on the same day, and assigned to Anzus, Inc.

On the other hand, when correlating objects from sensors, reference image(s) 100 and comparison image(s) 105 may be designed to compare the location and/or other track data of an object from one sensor against the location and/or other track data of the same object from a different sensor. Reference image(s) 100 and comparison image(s) 105 may comprise patterns based upon current and/or previously received track data for objects. Reference image(s) 100 and comparison image(s) 105 may have substantially the same pattern when describing the same object. For instance, reference image(s) 100 and comparison image(s) 105 may be designed in a grid based upon rows dedicated for a type of data and columns dedicated for a time reference or order within which the track data is received. Each cell may comprise a pattern, color, and/or translucency or opacity based upon the value or magnitude of the track data, such as the speed, direction, position, velocity, or the like. One such technique, incorporated herein by the following reference, is described in a co-pending patent application entitled "Methods and Arrangements to Enhance Correlation", Ser. No. 10/093,873, filed on the same day, and assigned to Anzus, Inc.

Display 110 may comprise one or more spatial light modulators (SLM) 115, for instance, to display reference image(s) 100 and comparison image(s) 105 as coherent images at the input plane 132, or the object plane, of optical correlator 130. The SLM 115 may portray the image as a coherent image with a coherent light source 120 such as a laser. Coherent light source 120 may comprise optical elements to produce a collimated beam of a size to illuminate the one or more SLM.

Optical correlator 130 may couple with display 110 to output an interference intensity substantially proportional to a cross-correlation of the reference image with the comparison image. Optical correlator 130 may comprise input plane 132, Fourier transform plane 134, and correlation plane 138. Input plane 132 may be the object plane of a Fourier transform lens system for optical correlator 130. Optical correlator 130 may comprise a lens to optically transform the reference image with the comparison image at input plane 132 into an equivalent analog Fourier transform of the images at Fourier transform plane 134. The Fourier transform of the images may comprise an interference term that may be equivalent or substantially proportional to the cross-correlation of the reference image and the comparison image upon inverse Fourier transformation. In some embodiments a correlation filter may be located at the output of Fourier transform plane 134 to binarize the image at the Fourier transform plane using a threshold function to produce a signal that may be written onto a binary SLM. After cross-correlation of the comparison image with the reference image, a lens may produce the inverse Fourier transform of the cross-correlation on correlation plane 138. In many embodiments, one or more focal adjustment lenses may be inserted into the Fourier lens system to adjust the focal lengths or points of the transform and inverse transform lenses. For instance, a focal adjustment lens may be inserted between the Fourier transform plane 134 and the correlation plane 138 to reduce the distance between the planes. A reduction of the focal lengths of a Fourier transformation lens and an inverse Fourier transformation lens may reduce the size of optical correlator 130.

In some embodiments, the Fourier transform, inverse Fourier transform, focal adjustments, and/or a combination thereof, may be accomplished by converting the signals to digital or analog electrical signals. The digital or analog electrical signals may be manipulated via a computer, state machine, or the like. For example, an embodiment may perform filtering by means of a computer and may locate a detector at Fourier transform plane 134, perform the filtering with the computer, and display the resulting image with a coherent SLM at a correct focal length for the inverse Fourier transform lens of optical correlator 130.

Optical correlator 130 may comprise a frequency plane correlator, a joint transform correlator, or a hybrid correlator. The joint-transform optical correlator, however, may offer an advantage of using a single SLM to display the reference image and comparison image, and provide an insensitivity to the alignment of the reference image and the comparison image(s). Displaying reference image(s) 100 and comparison image(s) 105 on the same display may also reduce efforts to cause more than one SLM to display the images at the input plane 132. The main difference between the joint-transform optical correlator and the frequency plane correlator is the use of spatial domain representation of filters. Real-time input of the images in the spatial domain may allow for a fully real-time system operation. This means there may be no need to insert a pre-computed filter into the Fourier plane, which may keep throughput up and may allow instantaneous changes to the reference image and/or comparison image. Further, a non-linear optical correlator may provide a greater image discrimination capability, as well as a greater interference peak intensity.

Detector 140 may couple with optical correlator 130 at correlation plane 138 to detect the interference intensity resulting from the cross-correlation of the reference image with the comparison image. Detector 140 may comprise a charge-coupled device, such as a video camera, to capture the interference intensity of the cross-correlation on the correlation plane 138, as well as the location of the intensity for correlating tracks and gridlocking sensors. A charge-coupled device may comprise imaging cells and may generate a charge on each cell in proportion to the light intensity at correlation plane 138. After a timed exposure, the intensity of the light at imaging cells on the charge-coupled device may be read by generating a signal having a charge substantially proportional to the light intensities at the imaging cells. In other embodiments, detector 140 may comprise a different intensity-sensing device such as an optically addressed SLM, or other optoelectronic device.

Comparator 145 may couple with detector 140 to receive the interference intensity or intensities as measured by detector 140. Comparator 145 may associate the first object, or subject of the reference image, with the second object, or subject of the first comparison image, based upon the first peak interference intensity and a second peak interference intensity. The first peak interference intensity may be substantially proportional to a cross-correlation of the reference image with a first comparison image and the second peak interference intensity may be substantially proportional to a cross-correlation of the reference image with a second comparison image. For instance, reference image(s) 100 and comparison image(s) 105 may comprise a reference image, the first comparison image and the second comparison image. Display 110 may display coherent images of each at input plane 132. As a result, optical correlator 130 may output a first peak interference intensity s at a first group of imaging cells and may output the second peak interference intensity at a second group of imaging cells. Detector 140 may determine the first peak interference intensity at the first group of imaging cells and the second peak interference intensity at the second group of imaging cells. The location of the first group of imaging cells may be within a first area of correlation plane 138 based upon the spacing between the first comparison image and the reference image at the input plane 132. Further, the first peak interference intensity may be offset from the center of first area based upon an offset between the first comparison image and the reference image at input plane 132. Similarly, the second peak interference intensity may be associated with an offset between the second comparison image and the reference image at input plane 132. In many embodiments, the interference intensity may be based upon the distance between the corresponding reference and comparison images. In further embodiments, more than one reference image may be compared to more than one comparison image.

After associating interference intensities with the first comparison image and the second comparison image, comparator 145 may output feedback to an image generation system via output to image generation system 160 and/or output track data to theater system 170. The feedback to the image generation system may comprise a coordinate transformation, data to determine a coordinate transformation, a track association, data to initiate, maintain, or terminate a track association, or a combination thereof. When reference image(s) 100 and comparison image(s) 105 comprise images to perform a correlation of tracks, comparator 145 may determine a cost to associate the first track with the second track and/or the first track with the third track, wherein the first track is associated with a reference image, the second track is associated with a first comparison image and the third track is associated with a second comparison image. The cost may be based upon the interference intensity associated with a comparison of the reference image with one of the comparison images or may be equivalent or substantially proportional to the charge determined by detector 140. One or more of the costs may be transmitted to the image generation system to match or facilitate matching tracks associated with the reference image and the comparison image.

In some embodiments, comparator 145 may comprise an input from link(s) 150 comprising the tracks associated with reference image(s) 100 and comparison image(s) 105. In several of these embodiments, comparator 145 may provide feedback to the image generation system such as a pair or pairs of tracks. A matched pair of tracks or one track of the matched pair of tracks may also be transmitted to theater system 170.

When reference image(s) 100 and comparison image(s) 105 comprise images to perform gridlocking of sensors, comparator 145 may determine the translation and rotation of the reference sensor with respect to a comparison sensor. For example, display 110 may determine the offset and interference intensity for more than one comparison image. The comparison images may be located in different positions of display 110 or may be received in a sequence, and the position or sequence may be associated with a rotation of a comparison image. The first comparison image may be associated with a rotation of 10 degrees and the second comparison image comparison image may comprise the first comparison image rotated by a number of degrees such as ten degrees, the third comparison image may comprise the second comparison image rotated ten degrees or the first comparison image rotated 20 degrees, and so on up to 350 degrees. Comparator 145 may compare the interference intensities associated with comparison image(s) 105 and select the image with the highest interference intensity. After selecting the highest interference intensity, comparator 145 may determine the rotation associated with the image with the highest interference intensity based upon the position or sequence of the comparison image in a group of images.

Some embodiments may output the offset or translation and rotation to an image generation system via output to image generation system 160. In other embodiments, comparator 145 may comprise a coordinate transformation determiner to determine the coordinate transformation between sensors associated with the reference image and comparison image based upon the rotation and offset associated with the comparison image. The coordinate transformation may transform sensors to a global coordinate system, absolute coordinate system, or a coordinate system local to the theater. In these embodiments, the coordinate transformation may be output to the image generation system. In other embodiments, the coordinate transformation may be applied to incoming tracks via link(s) 150 before transmitting the tracks to an image generation system. In still further embodiments, the coordinate transformation may also be output to theater system 170.

Theater system 170 may model the objects sensed by sensors in a theater. For clarity, the model may comprise one track for each object determined to be located in the theater although some objects may be sensed by more than one sensor. Depending upon the configuration of the sensor system, correlation and/or gridlocking may modify and/or filter the tracks transmitted to theater system 170 via link(s) 150. For example, a sensor system may comprise mobile sensors. Correlation of the tracks from those sensors based upon reference image(s) 100 and comparison image(s) 105 may determine the tracks within a sensor overlap by matching the tracks. Images based upon the matched tracks may then be transmitted as reference image(s) 100 and comparison image(s) 105 to determine a coordinate transformation between the sensors. Theater system 170 may receive unmatched tracks and one track from each set of matched tracks transformed according to the coordinate transformation. Theater system 170 may map objects into the theater and/or update the position of an object mapped in the theater, in memory of theater system 170, based upon the tracks received from comparator 145.

Figure 2:
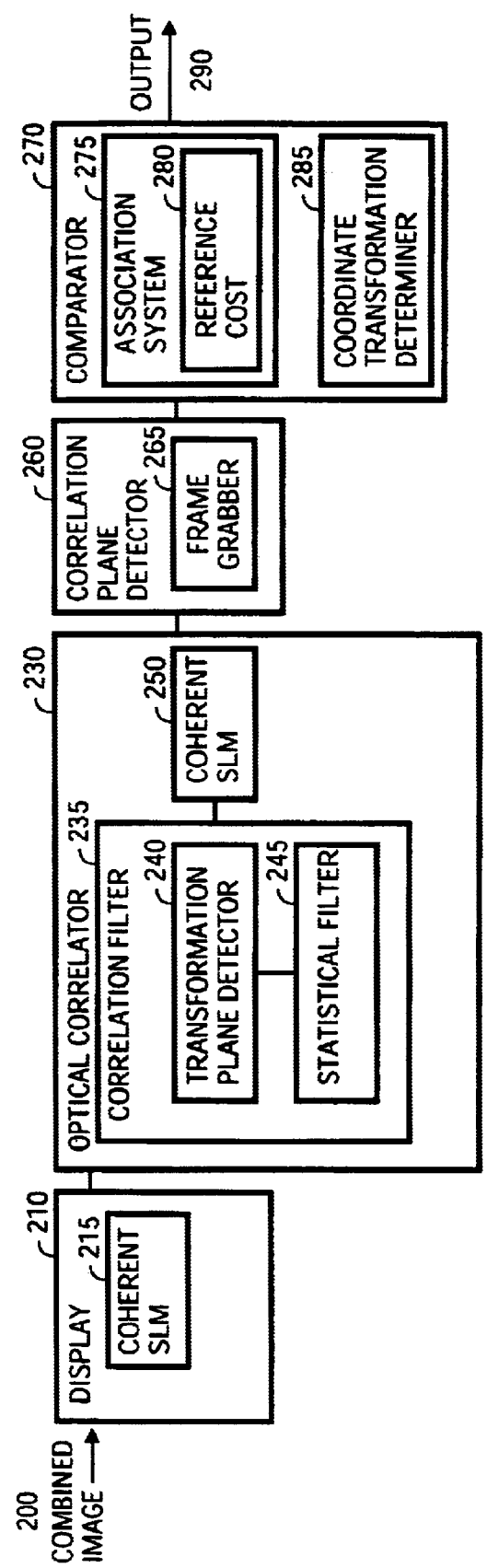
FIG. 2 depicts an embodiment of an apparatus to correlate objects and gridlock sensors with images based upon track data from sensors.

Referring now to FIG. 2, there is shown an embodiment of an apparatus to correlate objects and gridlock sensors with images based upon track data from sensors. The embodiment may comprise display 210, optical correlator 230, correlation plane detector 260, and comparator 270. Display 210 may receive a reference image and a comparison image to display as coherent images. The reference image may comprise track data from a first track about a first object and the comparison image may comprise track data from a second track about a second object. In some situations, the comparison image may be generated to determine whether the second object is the first object. Embodiments may correlate the tracks with a reference image and comparison image based upon all or some of the track data available for the objects. Track data available for the objects may comprise data from current tracks and prior tracks. Track data about the same object sensed substantially simultaneously may appear as distinguishable patterns in the images even in situations wherein the reference image or the comparison image may comprise more historical track data. For example, the first sensor may begin tracking an object or target before the object enters the scope of a second sensor. The first sensor may generate three tracks, $F_{T0}$, $F_{T1}$ and $F_{T2}$ before the object enters the range of the second sensor and may receive a track at $F_{T3}$ almost simultaneously with the generation of track $S_{T0}$. The reference image may comprise four columns of data comprising a first color representing the position of the object and a second color representing the velocity of the object at each time reference or sequence, T0, T1, T2 and T3. The comparison image may comprise an image with one column to represent time reference or sequence T0. Since the data of track $S_{T0}$ may closely match the data of track $F_{T3}$, column T3 of the reference image may closely match column T0 of the comparison image. In other embodiments, columns may comprise data based upon time stamps associated with the data or the time or time frame the data represents.

In some embodiments, display 210 may receive the reference image and comparison image(s) as a combined image 200. Other embodiments may comprise a combined image generator to combine reference and comparison images into a combined image 200 for use by a joint-transform optical correlator, such as optical correlator 230. Combined image 200 may comprise a signal to display the reference image on one side of display 210 and one or more comparison images on the second side of display 210. A separation between the reference image and the comparison images, as well as between comparison images may be based upon physical characteristics of optical correlator 230 and, in some embodiments, based upon the operation of correlation filter 235. For instance, the interference intensity, from a comparison of the reference image and a comparison image, may be twice the distance from the on-axis autocorrelation intensity in the correlation plane, as the center of the comparison image is from the center of reference image in the input plane of optical correlator 230.

Display 210 may comprise a spatial light modulator, coherent SLM 215, to display the combined image at the input plane of optical correlator 230. Coherent SLM 215 may comprise a color, gray-scale or binary, electrically addressed or optically addressed SLM. The selection of coherent SLM 215 may depend upon the type of input received. For example, an embodiment may receive a reference and comparison image for gridlocking. The reference and comparison images may comprise a binary representation of positions within a sensor overlap of the reference sensor and the comparison sensor so display 210 may comprise a binary SLM to display the images at the input plane of optical correlator 230. Other embodiments, such as embodiments to correlate tracks based upon locations and velocities of an object, may receive images with multiple variations of colors or grays to represent different distances. The color, gray-scale, or binary coherent SLM 215 may display the images at the input plane(s).

Optical correlator 230 may couple with display 210 to output an interference intensity substantially proportional to a cross-correlation of the reference image with the comparison image. Optical correlator 230 may comprise a linear or non-linear joint-transform correlator. A joint-transform optical correlator may not require a matched spatial filter in the correlation process so the comparison of the reference image with the comparison image(s) may comprise continuously or substantially continuously updating the image(s). For instance, when the reference image and comparison images are generated to gridlock a reference sensor with more than one comparison sensor, the initial combined image 200 may comprise the reference image and comparison images of sensors one through thirteen at a zero degree rotation. Rotated images of each of the thirteen comparison sensors may be received in succession or substantially in succession to update the thirteen comparison images until the thirteen comparison images may rotate approximately 360 degrees. Optical correlator 230 may continuously or substantially continuously output an interference intensity proportional or nearly proportional to the cross-correlation of the reference image with the rotations of each comparison image to facilitate thirteen coordinate transform determinations substantially within the time to rotate the comparisons images 360 degrees.

In other embodiments, combined image 200 may comprise more or less than thirteen comparison images for comparison with a reference image, depending upon the resolution of coherent SLM 215. Further embodiments may couple with systems to increase the image density of the combined image 200 by wavelet compression. One such system, incorporated herein by the following reference, is described in a co-pending patent application entitled "Image Compression To Enhance Optical Correlation", Ser. No. 10/093,437, filed on the same day, and assigned to Anzus, Inc.

In further embodiments, optical correlator 230 may comprise a function encoded joint-transform optical correlator. In such embodiments, display 210 may display the reference image and the comparison image in different input planes of optical correlator 230. For instance, in the function encoded joint-transform optical correlator, the joint power spectrums of the comparison image and the reference image may be encoded with different phase functions. The different phase functions, such as quadratic phase functions, may encode the correlation terms such that the correlation terms are focused on a different output or correlation planes. The autocorrelations on the optical axis may focus on one correlation plane and the off-axis cross-correlation terms may also output into different correlation planes. As a result, the interference intensities proportional to or substantially proportional to the cross-correlations between the reference and comparison image(s) may output on one correlation plane and the autocorrelations and cross-correlations of the comparison images may output onto a different correlation plane.

In the present embodiment, optical correlator 230 may comprise a non-linear joint-transform optical correlator. The non-linear joint-transform optical correlator may comprise correlation filter 235, a non-linear filter at the Fourier transform plane to improve the optical correlation performance in terms of light efficiency, correlation peak size, output noise level, and sensitivity against similar objects. Correlation filter 235 may comprise a phase-only filter, a filter for a first-order correlation term of a binary joint transform optical correlator using a threshold function, or the like. The threshold function may modify the interference pattern between the reference image and a comparison image on the Fourier transform plane to values of plus one or minus one and the first-order harmonic term may comprise the correct phase information of the joint power spectrum.

Correlation filter 235 may comprise transformation plane detector 240 and statistical filter 245. Transformation plane detector 240 may be positioned at the Fourier transform plane of optical correlator 230 and may comprise an optically addressed SLM. Transformation plane detector 240 may measure the intensity of the interference pattern on the Fourier transform plane and may transmit the image to statistical filter 245. Statistical filter 245 may apply a non-linear function, such as a thresholding function and transmit the resulting image to coherent SLM 250. Coherent SLM 250 may comprise a binary SLM to display the first-order harmonic term of the interference pattern at the input plane of an inverse Fourier transform lens. An interference intensity proportional to or substantially proportional to the cross-correlation of the reference image and the comparison image may be projected onto the correlation plane of optical correlator 230.

In other embodiments, the inverse Fourier transform may be performed digitally with a computer, state machine, or the like, and the result or output may comprise an autocorrelation term for the reference image, an autocorrelation term for the comparison image, and a cross-correlation term based upon the reference image and the comparison image.

Correlation plane detector 260 may couple with optical correlator 230 to detect the interference intensity. In embodiments wherein the inverse Fourier transform may be determined optically, correlation plane detector 260 may comprise a charge-coupled device. In other embodiments, wherein the inverse Fourier transform may be determined statistically, correlation plane detector 260 may comprise a receiver to receive and/or interpret a signal or data output from optical correlator 230.

Correlation plane detector 260 may comprise a charge-coupled device to measure the interference intensity and may comprise a frame-grabber 265 to provide a digital value for pixels detected from the correlation plane of optical correlator 230. For example, combined image 200 may comprise images to correlate tracks from a reference sensor and a comparison sensor. The reference image of the reference sensor may be updated continuously or substantially continuously to cycle through each track of the reference sensor within a sensor overlap. The comparison image may comprise more than one image based upon more than one objects within the sensor overlap with the reference sensor. During each cycle, the interference intensity proportional to or substantially proportional to the similarity of the comparison image and the reference image may output to the correlation plane of optical correlator 230. The video camera may capture the light intensities of each interference intensity and the frame grabber 265 or video capture device may capture the interference intensities resulting from each successive reference image.

Comparator 270 may couple with correlation plane detector 260 to associate the first object with the second object based upon the interference intensity and a second interference intensity, wherein the second interference intensity is substantially proportional to a cross-correlation of the reference image with a second comparison image. Comparator 270 may receive the output of optical correlator 230 resulting from a comparison of images from a first object of a first sensor and a second object of a second sensor. Optical correlator 230 may output light having an intensity proportional to or substantially proportional to a cross-correlation between the reference image and a comparison image. That interference intensity may be converted into an electrical and/or digital signal by correlation plane detector 260 and transmitted to comparator 270.

In some embodiments, comparator 270 may comprise association system 275. Association system 275 may associate a track with an object and/or two tracks from different sensors with the same object. Association system 275 may determine a cost based upon or equivalent to the converted interference intensity. The cost may represent a probability that the object associated with the reference image is the object associated with the comparison image, or may represent a margin of error in a determination that the objects are the same. In many of these embodiments, association system 275 may comprise a cost buffer to store the cost. Association system 275 may assign tracks from one sensor to tracks of another sensor based upon the costs of each association with an assignment algorithm such as a Munkres assignment algorithm.

Embodiments of association system 275 may also comprise a reference cost 280. Reference cost 280 may comprise a cost, set of costs, or a cost curve. The cost to match each pair may be compared with reference cost 280 and may be accepted or rejected. Reference cost 280 may comprise a degree of accuracy set to determine that two tracks describe the same object or that two tracks do not describe the same object. For instance, when the cost to assign a reference track to a matched pair with a comparison track is higher or lower than indicated by reference cost 280, the match may be rejected. When the match is rejected, the margin of error in the match may be greater than the desired margin of error for a theater system.

Comparator 270 may comprise coordinate transformation determiner 285 to determine an offset associated with the interference intensity and to associate the comparison image with the rotation. Coordinate transformation determiner 285 may also determine a coordinate transformation for a first sensor based upon interference intensities output in response to images generated for gridlocking. Coordinate transformation determiner 285 may receive an output from correlation plane detector 260 such as the pair of images with the highest interference intensity or highest correlation value, and an offset adjustment for the corresponding reference and comparison images to obtain the highest correlation value. In such embodiments, comparator 270 may have or receive data to determine the sensor(s) associated with the offset and the orientation adjustment associated with the images. Coordinate transformation determiner 285 may output the offset and orientation adjustment to association system 275 to transform the data of tracks for the sensor(s). In further embodiments, comparator 270 may output correlation values or costs to associate tracks, such as the first track and the second track, with the same object.

Figure 3:
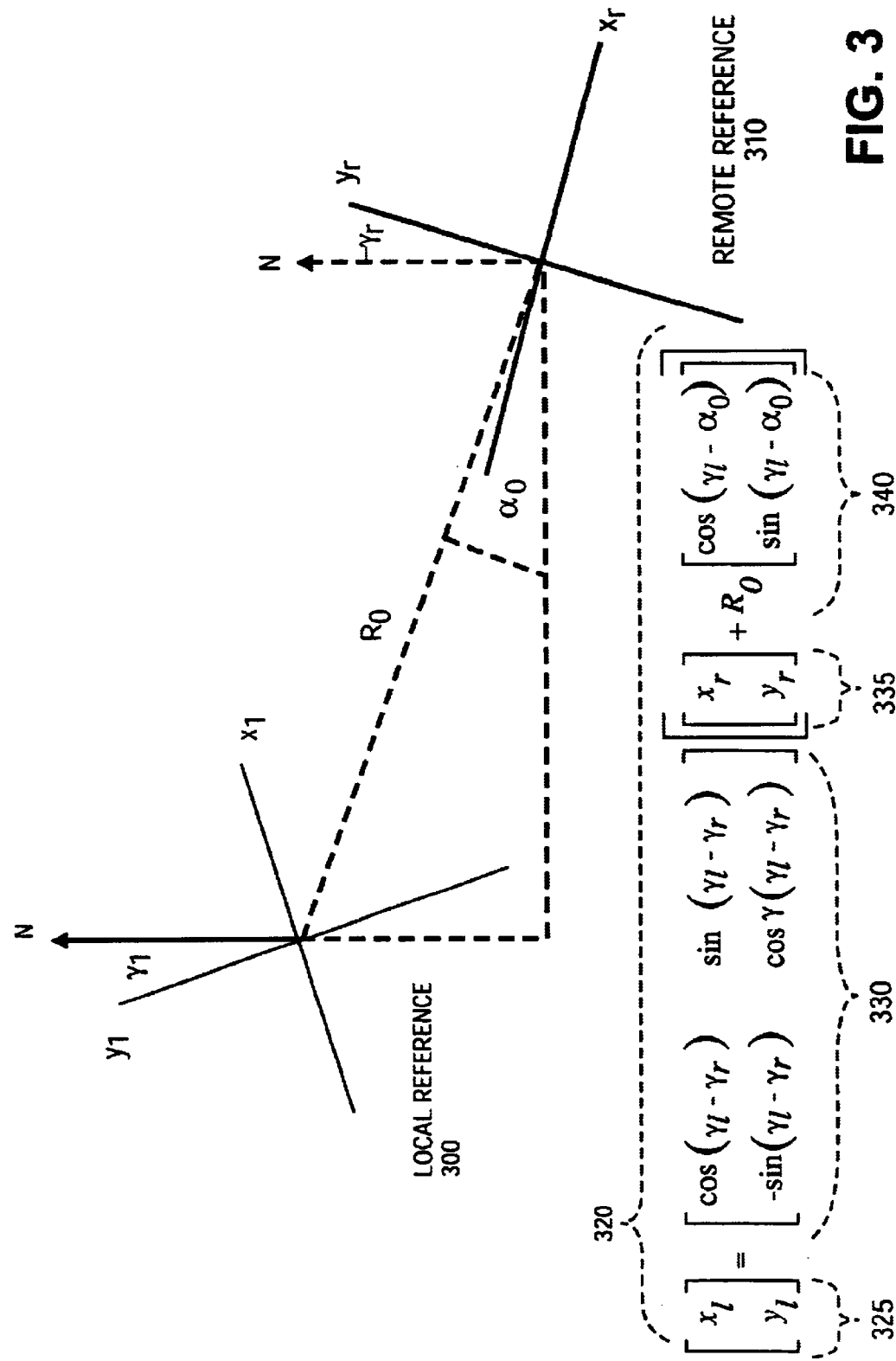
FIG. 3 depicts an embodiment of a coordinate transformation for a local sensor and a remote sensor to enhance gridlocking

Referring now to FIG. 3, there are shown an embodiment of a coordinate transformation for a local sensor and a remote sensor to correlate objects and gridlock sensors with images based upon track data from sensors. The figure depicts the coordinate system of a local sensor or reference sensor as a local reference 300, the coordinate system of a remote sensor or comparison sensor as a remote reference 310, and an equation 320 that may determine a coordinate transformation to rotate and translate the position of the remote sensor to correspond with or substantially match the coordinate system of the local sensor. Tracks from the remote reference may be rotated and translated based upon equation 320 to map objects sensed by the remote sensor with objects sensed by the local sensor in proper or substantially proper relation to one another. Therefore, repetitive tracks of the remote reference 310 may be discarded and tracks unique to the remote sensor with respect to the local sensor may be added to a model of the theater.

In some embodiments, more than two sensors may cover the area of a theater so selecting a single local reference 300 for the theater, such as a global coordinate system, and transforming the tracks unique to each of the more than two sensors may facilitate adding the tracks to the theater.

The coordinate transformation equation 320 comprises the equivalent two-dimensional coordinates 325, $(X_L, Y_L)$, for the remote reference 310 with respect to the local reference 300, equated to the sum of the two-dimensional coordinates 335, $(X_R, Y_R)$, for the remote reference 310 and a translation term 340 multiplied by the rotation matrix 330. The translation term comprises the distance, $R_O$, between the remote reference 310 and the local reference 300 multiplied a translation matrix to convert $R_O$ into x-axis and y-axis position differences, or Cartesian translations. The Cartesian translations may add to the two-dimensional coordinates 335 for the remote reference 310 to align the position of the remote reference 310 with the local reference 300. The sum of the two-dimensional coordinates 335 for the remote reference 310 and the translation term 340 may then be multiplied by the rotation matrix to correct a difference in rotation of the remote reference 310 with respect to the local reference 300.

In many system embodiments, the output of an optical correlator may provide a coordinate transformation determiner with correlation values and offsets to determine coordinate transformations for multiple tracks based upon the reference image and the comparison image. The resulting coordinate transformations may form independent equations based upon equation 320 to determine $R_O$, $\alpha_O$, $\gamma_L$, and $\gamma_L$. After these terms are determined for a reference sensor and a comparison sensor, transforming incoming tracks link(s) 150 from FIG. 1 may provide tracks with more closely related or matched coordinate systems, or may reduce the cost of association of tracks between the reference sensor and the comparison sensor.

Figure 4:
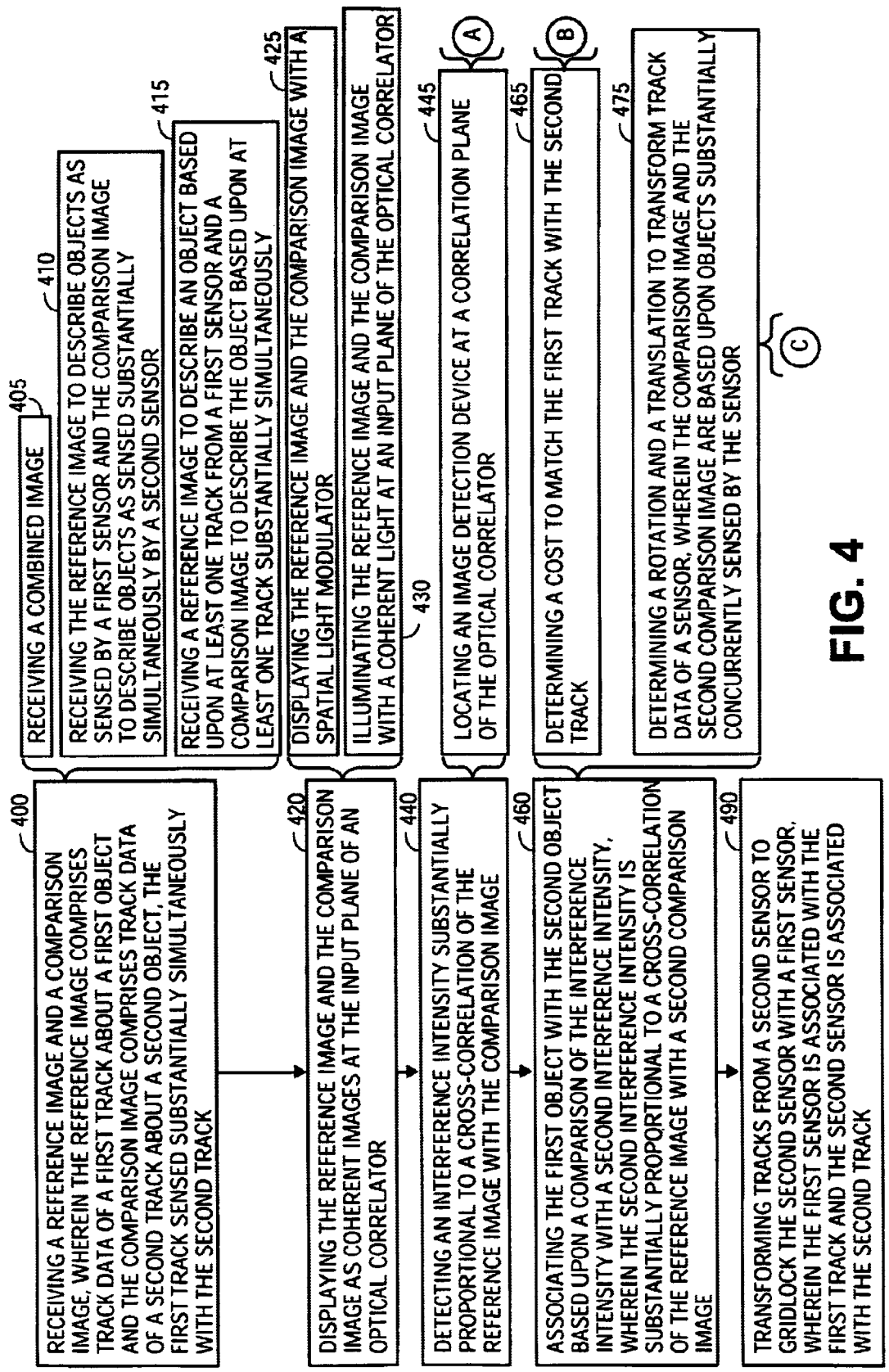
FIG. 4 depicts a flow chart of an embodiment to correlate objects and gridlock sensors with images based upon track data from sensors.
Figure 4:
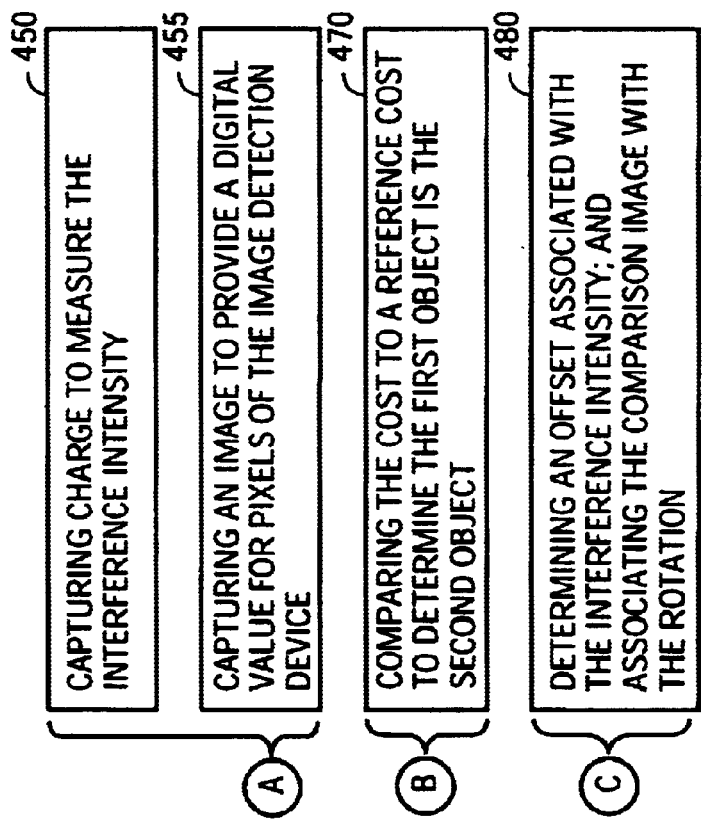

Referring now to FIG. 4, there is shown a flow chart of an embodiment to correlate objects and gridlock sensors with images based upon track data from sensors. The embodiment may comprise receiving a reference image and a comparison image, wherein the reference image comprises track data of a first track about a first object and the comparison image comprises track data of a second track about a second object, the first track sensed substantially simultaneously with the second track 400; displaying the reference image and the comparison image as coherent images at the input plane of an optical correlator 410; detecting an interference intensity substantially proportional to a cross-correlation of the reference image with the comparison image 440; associating the first object with the second object based upon a comparison of the interference intensity with a second interference intensity, wherein the second interference intensity is substantially proportional to a cross-correlation of the reference image with a second comparison image 460; and transforming tracks from a second sensor to gridlock the second sensor with a first sensor, wherein the first sensor is associated with the first track and the second sensor is associated with the second track 490. Receiving a reference image and a comparison image 400 may receive one or more comparison images per reference image to either determine an offset and/or rotation, or to determine whether the reference image describes the same object as one of the comparison images. In some embodiments, the comparison images may comprise a copy of the reference image. The copy of the reference image may cause the output of an autocorrelation of the reference image as an interference intensity, for the comparison of that set of images. The autocorrelation of the reference image may provide the highest cross-correlation value. More than one set of correlation values from different sets of images may be normalized based upon the autocorrelation values.

Receiving a reference image and a comparison image 400 may comprise receiving a combined image 405; receiving the reference image to describe objects as sensed by a first sensor and the comparison image to describe the objects as sensed substantially simultaneously by a second sensor 410; and receiving a reference image to describe an object based upon at least one track from a first sensor and a comparison image to describe the object based upon at least one track substantially simultaneously sensed by a second sensor 415. Receiving a combined image 405 may receive an image incorporating the reference image and one or more comparison images. For example, the spacing between the reference image and a comparison image in the combined image may be a fixed distance, (Yo) about the center of the input plane. The output of a linear joint-transform optical correlator in the correlation plane may comprise an autocorrelation centered on the correlation plane, unless a high pass filer is used to block direct current (DC) light, and side lobes comprising interference intensities substantially equivalent to the cross-correlation of the reference image and the comparison image at a distance of 2Yo from the center.

Receiving the reference image to describe objects as sensed by a first sensor and the comparison image to describe the objects as sensed substantially simultaneously by a second sensor 410 may comprise receiving images of describing the positions of objects within the same area, or space or sensor overlap, from two or more different sensors. Each image may describe the positions of the objects by distributing features in a pattern equivalent or substantially equivalent to the pattern of the objects as sensed by each sensor and may distribute the positions at a reduced or magnified scale.

Receiving a reference image to describe an object based upon at least one track from a first sensor and a comparison image to describe the object based upon at least one track substantially simultaneously sensed by a second sensor 415 may receive a reference image to describe an object sensed by a reference sensor one or more times over a period of time and may receive a comparison image to describe an object sensed by a comparison sensor one or more times within the same period of time to determine whether the objects are the same object. For example, the reference sensor may sense an object ten times in one minute. The comparison sensor may sense the object six times within the same minute. As a result, a reference image comprising features describing ten tracks of data for the object and a comparison image comprising features describing six tracks of data for the object may be received. When the objects are the same object, six of the features of the reference image may substantially match the six features of the comparison image. However, noisy data from sensors and dropped tracks may affect the degree of similarity between the reference image and the comparison image.

Displaying the reference image and the comparison image as coherent images at the input plane of an optical correlator 420 may comprise converting an incoherent image into a coherent image. Displaying the reference image and the comparison image as coherent images at the input plane of an optical correlator 420 may comprise displaying the reference image and the comparison image with a spatial light modulator 425 and illuminating the reference image and the comparison image with a coherent light at an input plane of the optical correlator 430. The incoherent image may be converted to a coherent image by illuminating the SLM with a coherent light source such as an Argon (Ar) or Helium-Neon (He—Ne) laser.

Detecting an interference intensity substantially proportional to a cross-correlation of the reference image with the comparison image 440 may capture light intensity at the output of an optical correlator. The light intensity may result from the inverse Fourier transform of the product of the Fourier transforms of the reference image and comparison image. Detecting an interference intensity substantially proportional to a cross-correlation of the reference image with the comparison image 440 may comprise locating an image detection device at a correlation plane of the optical correlator 445. In many embodiments, the optical correlator may focus the inverse Fourier transform of the product on one correlation plane so locating an image detection device at a correlation plane of the optical correlator 445 may comprise focusing the image detection device on the correlation plane comprising the inverse Fourier transform of the product.

Locating an image detection device at a correlation plane of the optical correlator 445 may comprise capturing charge to measure the interference intensity 450 and capturing an image to provide a digital value for pixels of the image detection device 455. Capturing charge to measure the interference intensity 450 may comprise providing a timed exposure of a charge-coupled device to the interference intensity at the correlation plane. The exposure may allow charge to build up on the charge-coupled device in areas corresponding to areas of the correlation plane comprising an interference intensity. Capturing an image to provide a digital value for pixels of the image detection device 455 may capture the charges on the charge-coupled of device at a moment in time to determine the interference intensity resulting from a comparison of a reference image and a comparison image.

Referring still to FIG. 4, associating the first object with the second object based upon a comparison of the interference intensity with a second interference intensity, wherein the second interference intensity is substantially proportional to a cross-correlation of the reference image with a second comparison image 460 may comprise determining a cost to match the first track with the second track 465 and, in some embodiments, may further comprise comparing the cost to a reference cost to determine the first object is the second object 470. Determining a cost to match the first track with the second track 465 may associate a value with the first track and the second track to indicate the likelihood that the first track and the second track comprise track data to describe the same object.

Comparing the cost to a reference cost to determine the first object is the second object 470 may determine whether the likelihood that the first track and second track describe the same object is high enough to eliminate either the first track or the second track from the theater, or the model in the theater system. When the cost to match the first track to the second track indicates a higher likelihood than the reference cost, only the first track or the second track may be transmitted to the theater system. On the other hand, when cost indicates a lower likelihood than the reference cost, both tracks may be transmitted to the theater system.

In addition, associating the first object with the second object 460 may comprise determining a rotation and a translation to transform track data of a sensor, wherein the comparison image and the second comparison image are based upon objects substantially concurrently sensed by the sensor 475. In this case, the comparison image and the second comparison image may comprise the same image except that at least one of the images may be rotated by an angle with respect to the track data used to generate the image(s). Determining a rotation and a translation to transform track data of a sensor 475 may select the highest interference intensity between the intensities associated with the comparison image and the second comparison image to determine which rotation causes the image to correlate more closely to the reference image.

Determining a rotation and a translation to transform track data of a sensor 475 may comprise determining an offset associated with the interference intensity; and associating the comparison image with the rotation 480. Determining an offset associated with the interference intensity; and associating the comparison image with the rotation 480 may determine a rotation and translation between the reference sensor and the comparison sensor based upon the image with the highest interference intensity. The rotation may comprise the rotation of the image associated with the highest interference intensity or may comprise an interpolated value between the image with the highest interference intensity and a prior or subsequent image. For example, the comparison images may comprise a reference image to determine the peak interference intensity for the set of images. After the interference intensities are determined for each rotation of a comparison image, the slope of change in interference intensities and/or the peak interference intensity may facilitate a determination of the rotation of the comparison image with the highest correlation with the reference image. In these embodiments, determining the rotation may comprise an interpolation or a similar calculation to determine the rotation.

Many embodiments may further comprise transforming tracks from a second sensor to gridlock the second sensor with a first sensor, wherein the first sensor is associated with the first track and the second sensor is associated with the second track 490. Transforming tracks from a second sensor to gridlock the second sensor with a first sensor 490 may determine a function to translate tracks of the second sensor to positions with respect to the first sensor. The function may adjust, refine, or transform the coordinate systems associated with the tracks to a coordinate system closer to the equivalent of the global coordinate system. A coordinate transformation determiner may interpret the data. The data may comprise, for example, the results of a cross-correlation between a reference or first image and a second image. The results may comprise a correlation rating associated with an image rotated by an angle and an offset. The coordinate transformation determiner may calculate a coordinate transformation in a manner similar to the manner described in FIG. 3, based upon the offset, angle, and the tracks used to generate the image rotated by the angle Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

Figure 5:
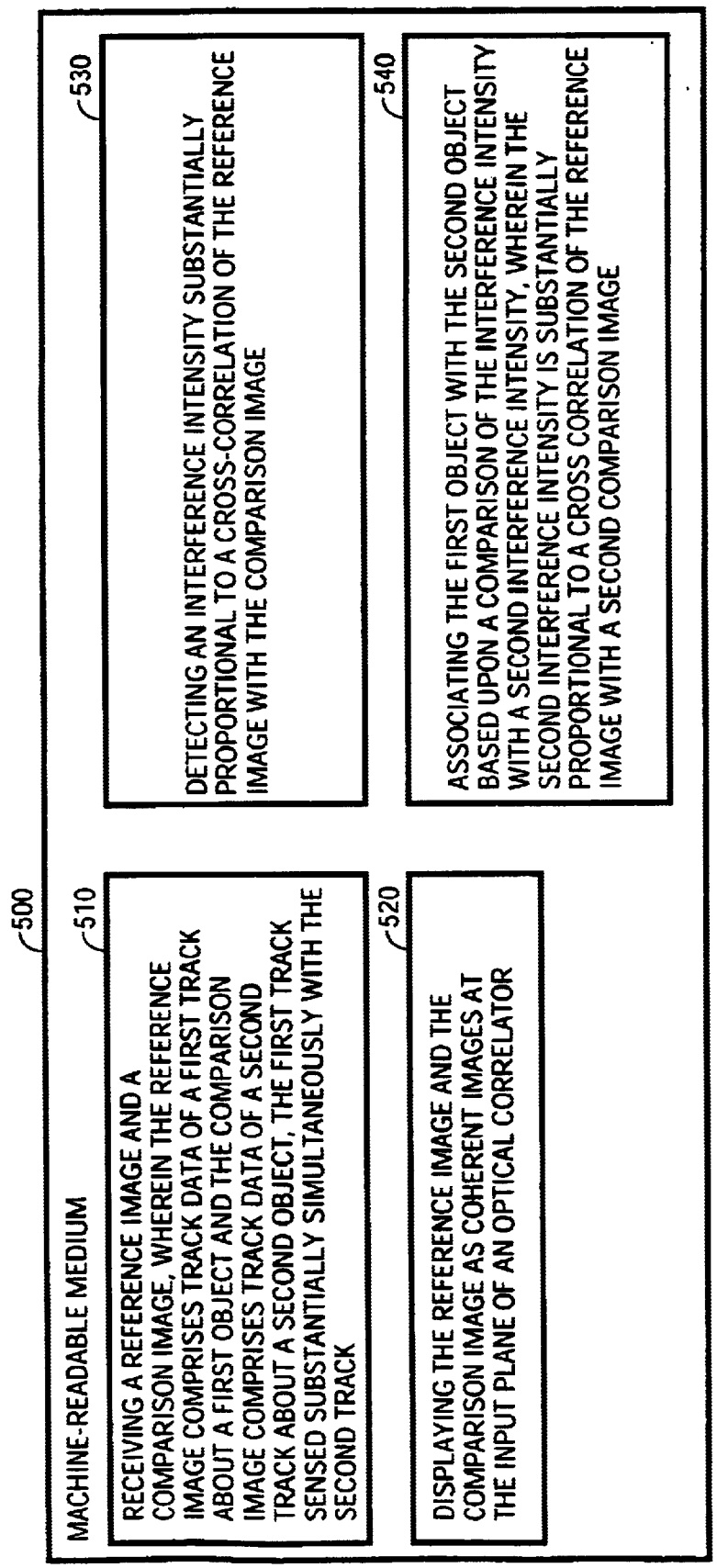
FIG. 5 depicts an embodiment of a machine-readable medium comprising instructions to correlate objects and gridlock sensors with images based upon track data from sensors.

In particular, FIG. 5 shows an embodiment of a machine-readable medium 500 comprising instructions, which when executed by a machine, cause the machine to perform operations, comprising receiving a reference image and a comparison image, wherein the reference image comprises track data of a first track about a first object and the comparison image comprises track data of a second track about a second object, the first track sensed substantially simultaneously with the second track 510; displaying the reference image and the comparison image as coherent images at the input plane of an optical correlator 520; detecting an interference intensity substantially proportional to a cross-correlation of the reference image with the comparison image 530; and associating the first object with the second object based upon a comparison of the interference intensity with a second interference intensity, wherein the second interference intensity is substantially proportional to a cross-correlation of the reference image with a second comparison image 540.

Instructions for receiving a reference image and a comparison image 510 may comprise instructions to receive a combined image or signals to display a combined image. The instructions to receive a combined image may comprise receiving a binary encoded signal to produce a combined image on a SLM. In some situations, the instructions may comprise instructions to combine the reference image and comparison image(s) into a single image.

Instructions for displaying the reference image and the comparison image as coherent images at the input plane of an optical correlator 520 may comprise instructions to display the image(s) on a SLM with a coherent light source to convert the image(s) into one or more coherent images.

Instructions for detecting an interference intensity substantially proportional to a cross-correlation of the reference image with the comparison image 530 may comprise instructions for capturing a light intensity output by an optical correlator on a correlation plane. In some embodiments, the instruction may further comprise determining digital or analog values for a pixel or group of pixels as a result of light intensities on the correlation plane.

Instructions for associating the first object with the second object based upon a comparison of the interference intensity with a second interference intensity, wherein the second interference intensity is substantially proportional to a cross-correlation of the reference image with a second comparison image 540 may comprise instructions to match tracks of different sensors based upon the light intensities and to determine coordinate transformations for the sensors. Associating the first object with the second object 540 may also comprise instructions to forward one track of a matched pair of tracks to a theater system, and in many embodiments, instructions to forward or transmit the unmatched tracks of a sensor to the theater system.

What is claimed is:

1. A method, comprising:
   receiving a reference image and a comparison image, wherein the reference image comprises track data of a first track about a first object and the comparison image comprises track data of a second track about a second object, the first track sensed substantially simultaneously with the second track;
   displaying the reference image and the comparison image as coherent images at the input plane of an optical correlator;
   detecting an interference intensity substantially proportional to a cross-correlation of the reference image with the comparison image; and associating the first object with the second object based upon a comparison of the interference intensity with a second interference intensity, wherein the second interference intensity is substantially proportional to a cross-correlation of the reference image with a second comparison image.

2. The method of claim 1, further comprising transforming tracks from a second sensor to gridlock the second sensor with a first sensor, wherein the first sensor is associated with the first track and the second sensor is associated with the second track.

3. The method of claim 1, wherein said receiving comprises receiving a combined image.

4. The method of claim 1, wherein said receiving comprises receiving the reference image to describe objects as sensed by a first sensor and the comparison image to describe the objects as sensed substantially simultaneously by a second sensor.

5. The method of claim 1, wherein said receiving comprises receiving a reference image to describe an object based upon at least one track from a first sensor and a comparison image to describe the object based upon at least one track substantially simultaneously sensed by a second sensor.

6. The method of claim 1, wherein said displaying comprises illuminating the reference image and the comparison image with a coherent light at an input plane of the optical correlator.

7. The method of claim 1, wherein said displaying comprises displaying the reference image and the comparison image with a spatial light modulator.

8. The method of claim 1, wherein said detecting comprises locating an image detection device at a correlation plane of the optical correlator.

9. The method of claim 8, wherein locating the image detection device comprises capturing charge to measure the interference intensity.

10. The method of claim 8, wherein locating the image detection device comprises capturing an image to provide a digital value for pixels of the image detection device.

11. The method of claim 1, wherein said associating comprises determining a cost to match the first track with the second track.

12. The method of claim 11, wherein said associating further comprises comparing the cost to a reference cost to determine the first object is the second object.

13. The method of claim 1, wherein said associating comprises determining a rotation and a translation to transform track data of a sensor, wherein the comparison image and the second comparison image are based upon objects substantially concurrently sensed by the sensor.

14. The method of claim 13, wherein determining a rotation and a translation comprises:
determining an offset associated with the interference intensity; and
associating the comparison image with the rotation.

15. An apparatus, comprising:
a display to receive a reference image and a comparison image to display as coherent images, the reference image based upon a first track about a first object and the comparison image based upon a second track about a second object sensed substantially simultaneously with the first track;
an optical correlator coupled with said display to output an interference intensity substantially proportional to a cross-correlation of the reference image with the comparison image;
a detector coupled with said optical correlator to detect the interference intensity; and
a comparator coupled with said detector to associate the first object with the second object based upon the interference intensity and a second interference intensity, wherein the second interference intensity is substantially proportional to a cross-correlation of the reference image with a second comparison image.

16. The apparatus of claim 15, wherein said display comprises a spatial light modulator.

17. The apparatus of claim 16, wherein the spatial light modulator comprises an electrically-addressed spatial light modulator.

18. The apparatus of claim 16, wherein the spatial light modulator comprises an optically-addressed spatial light modulator.

19. The apparatus of claim 16, wherein the spatial light modulator comprises a gray-scale spatial light modulator.

20. The apparatus of claim 15, wherein said optical correlator comprises a joint transform optical correlator.

21. The apparatus of claim 20, wherein the joint transform optical correlator comprises a non-linear joint transform optical correlator.

22. The apparatus of claim 20, wherein the joint transform optical correlator comprises a correlation filter.

23. The apparatus of claim 15, wherein said detector comprises a frame-grabber to provide a digital value for pixels.

24. The apparatus of claim 15, wherein said detector comprises a charge-coupled device to measure the interference intensity.

25. The apparatus of claim 15, wherein said comparator comprises an association system to match the first track with the second track based upon the interference intensity.

26. The apparatus of claim 25, wherein the association system comprises a reference cost to determine the first object is the second object.

27. The apparatus of claim 15, wherein said comparator comprises a coordinate transformation determiner to determine an offset associated with the interference intensity and to associate the comparison image with the rotation.

28. An apparatus, comprising:
a display to receive a reference image and a comparison image to display as coherent images, the reference image based upon a first track about a first object and the comparison image based upon a second track about a second object sensed substantially simultaneously with the first track;
an optical correlator coupled with said display to output an interference intensity substantially proportional to a cross-correlation of the reference image with the comparison image;
a detector coupled with said optical correlator to detect the interference intensity;
a comparator coupled with said detector to associate the first object with the second object based upon the interference intensity and a second interference intensity, wherein the second interference intensity is substantially proportional to a cross-correlation of the reference image with a second comparison image; and
a theater system coupled with said comparator to determine a model of objects in an area based upon the interference intensity.

29. The apparatus of claim 28, wherein said theater system comprises memory to store a model.

30. The apparatus of claim 28, wherein said theater system comprises circuitry to update the model based upon the first track.

31. A machine-readable medium containing instructions, which when executed by a machine, cause said machine to perform operations, comprising:

receiving a reference image and a comparison image, wherein the reference image comprises track data of a first track about a first object and the comparison image comprises track data of a second track about a second object, the first track sensed substantially simultaneously with the second track;

displaying the reference image and the comparison image as coherent images at the input plane of an optical correlator;

detecting an interference intensity substantially proportional to a cross-correlation of the reference image with the comparison image; and associating the first object with the second object based upon a comparison of the interference intensity with a second interference intensity, wherein the second interference intensity is substantially proportional to a cross-correlation of the reference image with a second comparison image.

32. The machine-readable medium of claim 31, further comprising transforming tracks from a second sensor to gridlock the second sensor with a first sensor, wherein the first sensor is associated with the first track and the second sensor is associated with the second track.

33. The machine-readable medium of claim 31, wherein said associating comprises determining a rotation and a translation to transform track data of a sensor, wherein the comparison image and the second comparison image are based upon objects substantially concurrently sensed by the sensor.

34. The machine-readable medium of claim 31, wherein said associating comprises determining a cost to match the first track with the second track, wherein the first track of a first sensor with a track of a second sensor.

* * * * *